Patented Apr. 25, 1950

2,505,077

UNITED STATES PATENT OFFICE 2,505,077

WELDING ROD

William A. Wissler, Niagara Falls, N. Y., assignor, by mesne assignments, to Union Carbide and Carbon Corporation, a corporation of New York No Drawing. Application November 19, 1948, Serial No. 61,130

3 Claims. (Cl. 219—8)

This invention relates to a welding rod, particularly suitable for the deposition of hard facing overlays on metal articles.

It is often desirable for both technological and economical reasons to make an article having a relatively soft metal matrix and a surface coating of hard wear resistant metal. For many purposes composite articles of this type have an increased period of usefulness for offsetting any increase in manufacturing costs.

A primary object of this invention is to provide a welding rod suitable for use in the preparation of hard facing overlays. Another object is to provide a welding rod which can be applied advantageously as a hard facing material to points of excessive wear on conveyor parts, plowshares, bearings, and numerous other articles.

The invention comprises a ferrous welding rod containing, in addition to iron and incidental impurities, 5.0% to 15.0% molybdenum, 3.0% to 4.5% carbon, 0.25% to 2.0% silicon, 0.25% to 2.0% manganese, 0.25% to 2.0% chromium, 0.25% to 2.0% phosphorus, and 0.25% to 1.0% boron.

In its preferred form the welding rod of the invention comprises 8.0% to 12.0% molybdenum, 3.25% to 3.75% carbon, 0.50% to 1.25% silicon, 0.50% to 1.25% manganese, 0.25% to 0.50% chromium, 0.25% to 1.0% phosphorus, 0.25% to 0.75% boron, remainder iron and incidental impurities.

Chromium and boron are added to the rod of the invention to increase the wear resistance and hardness respectively of the hard facing overlay. Phosphorus when added to the welding rod tends to lower its melting point. The quantities of these three elements may be varied according to the melting characteristics desired in the welding rod and the degree of wear resistance and hardness desired in the hard facing overlay. Part or all of the molybdenum in the welding rod may be replaced by tungsten without changing materially the properties of the deposit provided that the amount of tungsten used is fifty per cent greater than the molybdenum it replaces. In other words, when the proportion of molybdenum is less than 5%, tungsten should be present in an amount equal to 1.5 times the quantity (5% minus the per cent molybdenum), but in no event should the amount of tungsten exceed 1.5 times the quantity (15% minus the per cent molybdenum).

The wear resistant properties of overlays prepared from a welding rod of the composition contemplated by the invention are demonstrated by actual tests wherein ordinary steel plowshares both with and without overlays were used under comparable conditions. A plowshare without treatment gave satisfactory results in the plowing of only seven acres, and a like plowshare faced with a tungsten carbide rod lasted only fifteen acres before showing equivalent wear. In contrast to these figures, a similar plowshare faced with an overlay prepared from a rod made in accordance with the preferred limits of this invention was in good condition after having been used to plow forty acres.

Depositions from rods of this invention have hardnesses ranging from 61 to 69 Rockwell C, depending somewhat upon the composition. Any of the standard welding methods can be used to deposit the rod although it should be noted that arc-welded deposits are slightly softer than deposits made by gas welding processes.

A welding rod within the limits of this invention that has given highly satisfactory results has the following composition: molybdenum 10%, carbon 3.5%, silicon 1%, manganese 1%, chromium 0.25%, phosphorus 0.30%, boron 0.25%, remainder iron.

Rods of this invention can be made by any of the standard methods. The elements in the proper proportions may be fused together and cast as a welding rod. The materials may be mixed and enclosed in a metal tube so that when melted the deposit is within the desired range of composition. It is also possible to coat a suitable steel rod with compounds of chromium and molybdenum so that the rod when used gives a facing that falls within the range of this invention. Other methods for manufacturing welding rods may be employed if desired.

I claim:

1. A welding rod composed of at least one metal from the group consisting of molybdenum and tungsten, the amount of molybdenum not exceeding 15.0%, the amount of tungsten being at least 1.5 times the quantity (5.0% minus the per cent of molybdenum) with amounts of molybdenum less than 5.0%, and not exceeding 1.5 times the quantity (15.0% minus the per cent molybdenum), carbon between 3.0% and 4.5%, silicon between 0.25% and 2.0%, manganese between 0.25% and 2.0%, chromium between 0.25% and 2.0%, phosphorus between 0.25% and 2.0%, boron between 0.25% and 1.0%, the remainder iron.

2. A welding rod composed of at least one metal from the group consisting of molybdenum and tungsten, the amount of molybdenum not exceeding 12.0%, the amount of tungsten being at least 1.5 times the quantity (8.0% minus the per cent molybdenum) with quantities of molybdenum less than 8.0%, and not exceeding 1.5 times the quantity (12.0% minus the per cent molybdenum), carbon between 3.25% and 3.75%, silicon between 0.50% and 1.25%, manganese between 0.50% and 1.25%, chromium between 0.25% and 0.50%, phosphorus between 0.25% and 1.0%, boron between 0.25% and 0.75%, the remainder iron.

3. A welding rod composed of 10.0% molybdenum, 3.5% carbon, 1.0% silicon, 1.0% manganese, 0.25% chromium, 0.30% phosphorus, 0.25% boron, the remainder iron.

WILLIAM A. WISSLER.

REFERENCES CITED

The following references are of record in the file of this patent:

UNITED STATES PATENTS

| Number | Name | Date |
|---|---|---|
| 2,118,296 | de Goyler | May 24, 1938 |
| 2,152,637 | de Goyler | Apr. 4, 1939 |
| 2,224,448 | Schlumf | Dec. 10, 1940 |